(12) United States Patent
Peters et al.

(10) Patent No.: US 10,393,562 B2
(45) Date of Patent: Aug. 27, 2019

(54) METHOD AND CONTROL DEVICE FOR DETERMINING A GAS CONSUMPTION OF A GAS-POWERED ENGINE

(71) Applicants: Stefan Peters, Augsburg (DE); Günter Heider, Kühbach (DE); Thomas Kremser, Augsburg (DE)

(72) Inventors: Stefan Peters, Augsburg (DE); Günter Heider, Kühbach (DE); Thomas Kremser, Augsburg (DE)

(73) Assignee: MAN Energy Solutions SE, Augsburg (DE)

( * ) Notice: Subject to any disclaimer, the term of this patent is extended or adjusted under 35 U.S.C. 154(b) by 326 days.

(21) Appl. No.: 15/134,111

(22) Filed: Apr. 20, 2016

(65) Prior Publication Data

US 2016/0313163 A1 Oct. 27, 2016

(30) Foreign Application Priority Data

Apr. 21, 2015 (DE) .................. 10 2015 005 043

(51) Int. Cl.
*G01F 9/00* (2006.01)
*F02D 19/02* (2006.01)
*F02D 19/06* (2006.01)
*F02D 41/00* (2006.01)

(52) U.S. Cl.
CPC .......... *G01F 9/001* (2013.01); *F02D 19/028* (2013.01); *F02D 19/029* (2013.01); *F02D 19/0628* (2013.01); *F02D 41/0027* (2013.01); *F02D 2200/0406* (2013.01); *F02D 2200/0414* (2013.01); *F02D 2200/0611* (2013.01); *F02D 2200/0625* (2013.01); *F02D 2200/703* (2013.01); *Y02T 10/32* (2013.01); *Y02T 10/36* (2013.01)

(58) Field of Classification Search
CPC ...... G01F 9/001; F02D 19/028; F02D 19/029; F02D 19/0628; F02D 41/0027; F02D 2200/0406; F02D 2200/0414; F02D 2200/0611; F02D 2200/0625; F02D 2200/703; Y02T 10/32; Y02T 10/36
USPC ...................................... 73/114.52
See application file for complete search history.

(56) References Cited

U.S. PATENT DOCUMENTS

| | | | | |
|---|---|---|---|---|
| 4,597,265 A | * | 7/1986 | Buck ....................... | F02B 37/12 60/600 |
| 6,466,859 B1 | * | 10/2002 | Fujime ................. | G05B 13/027 700/50 |

(Continued)

FOREIGN PATENT DOCUMENTS

| | | |
|---|---|---|
| DE | 112006001271 | 3/2008 |
| DE | 112012000300 | 9/2013 |
| WO | WO 2006/122427 | 11/2006 |

*Primary Examiner* — Marrit Eyassu
(74) *Attorney, Agent, or Firm* — Cozen O'Connor

(57) ABSTRACT

A method for determining a gas consumption of a gas-powered gas engine or a gas-powered dual-fuel engine. The engine is operated under actual operating conditions, and the actual gas consumption of the engine is acquired under the actual operating conditions. A target gas consumption of the engine to be anticipated under target operating conditions is calculated depending on the actual gas consumption and depending on discrepancies between the actual operating conditions and the target operating conditions.

10 Claims, 1 Drawing Sheet

(56) References Cited

U.S. PATENT DOCUMENTS

| | | | | |
|---|---|---|---|---|
| 7,072,762 B2* | 7/2006 | Minami | ............... | G01F 9/023 |
| | | | | 340/439 |
| 2006/0123782 A1* | 6/2006 | Rosin | ............... | F02D 41/1448 |
| | | | | 60/599 |
| 2007/0256481 A1* | 11/2007 | Nishiyama | ............... | G01F 9/02 |
| | | | | 73/114.52 |
| 2008/0040014 A1* | 2/2008 | Yahata | ............... | F01N 3/0222 |
| | | | | 701/99 |
| 2009/0094978 A1* | 4/2009 | Yamagata | ............... | F01N 13/107 |
| | | | | 60/602 |
| 2010/0275575 A1* | 11/2010 | Brown | ............... | F02C 9/00 |
| | | | | 60/204 |
| 2011/0106400 A1* | 5/2011 | Takashima | ............... | F02D 35/02 |
| | | | | 701/102 |
| 2012/0239270 A1* | 9/2012 | Ikeda | ............... | F02D 41/263 |
| | | | | 701/102 |
| 2013/0046452 A1 | 2/2013 | Moscherosch et al. | | |
| 2014/0067212 A1* | 3/2014 | Ueno | ............... | F02D 43/04 |
| | | | | 701/54 |
| 2015/0219027 A1* | 8/2015 | zur Loye | ............... | F02D 41/0027 |
| | | | | 60/603 |
| 2016/0186679 A1* | 6/2016 | Bizub | ............... | F02D 41/0052 |
| | | | | 60/274 |

* cited by examiner

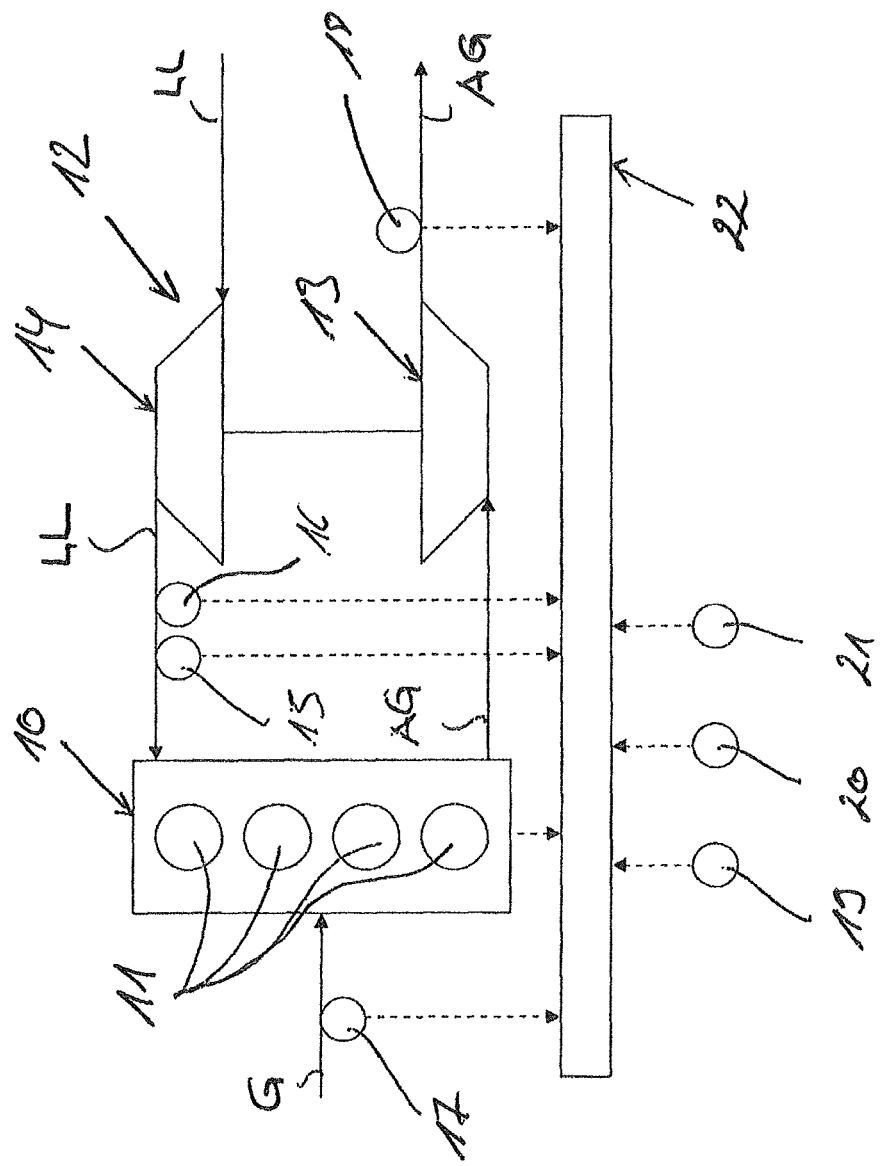

METHOD AND CONTROL DEVICE FOR DETERMINING A GAS CONSUMPTION OF A GAS-POWERED ENGINE

BACKGROUND OF THE INVENTION

1. Field of the Invention

The invention is directed to a method for determining the gas consumption of a gas-powered engine. The invention is further directed to a control device for implementing the method.

2. Description of the Related Art

It is known that the fuel consumption of a diesel engine, for example, the fuel consumption of a marine diesel engine, depends on the prevailing operating conditions or prevailing ambient conditions under which the diesel engine is operated. Therefore, it is known from diesel engines to convert an actual fuel consumption acquired under actual operating conditions or actual ambient conditions to a target fuel consumption or reference fuel consumption under target or reference operating conditions or target or reference ambient conditions.

For example, for gas-powered gas engines or gas-powered dual-fuel engines, it has been assumed heretofore that a motor control device can fully compensate for fluctuating operating conditions and fluctuating ambient conditions, particularly a fluctuating ambient air pressure, a fluctuating ambient air temperature, a fluctuating ambient air humidity, a fluctuating methane number of the gas, a fluctuating ignition timing of the engine, a fluctuating charge air temperature and a fluctuating exhaust gas backpressure, so that the fuel consumption of a gas-powered engine is not dependent on these operating conditions and ambient conditions of the gas-powered engine.

However, practice has shown that gas-powered engines cannot fully compensate for the above-mentioned operating conditions and ambient conditions so that the gas consumption of gas-powered engines is quite dependent on the above-mentioned operating conditions and ambient conditions.

SUMMARY OF THE INVENTION

An object of the invention is to provide a novel method for determining the gas consumption of a gas-powered engine and a control device for implementing the method.

According to one aspect of the invention, the engine is operated under actual operating conditions, the actual gas consumption is acquired under the actual operating conditions, a target gas consumption to be anticipated under target operating conditions is calculated depending on the actual gas consumption and depending on discrepancies between the actual operating conditions and the target operating conditions.

It is suggested for the first time by one aspect of the present invention that an actual gas consumption of a gas-powered engine, which is determined under actual operating conditions, be converted to target or reference operating conditions. Thus the invention is based on the insight that the gas consumption of a gas-powered engine is definitely dependent on operating conditions and ambient conditions such as ambient air pressure and/or ambient air temperature and/or ambient air humidity and/or methane number of the gas and/or ignition timing of the engine and/or charge air temperature and/or exhaust gas backpressure and/or charge pressure, and it is suggested according to the invention that an actual gas consumption acquired under actual operating conditions be converted to a target or reference gas consumption under target or reference operating conditions.

An optimized operation of a gas-powered engine is made possible by one aspect of the invention. An actual gas consumption determined on a test block can be securely and reliably converted from the actual operating conditions prevailing on the test block to other operating conditions.

A discrepancy between an actual ambient air pressure, and a target ambient air pressure, and/or a discrepancy between an actual ambient air temperature and a target ambient air temperature, and/or a discrepancy between an actual exhaust gas backpressure and a target exhaust gas backpressure, and/or a discrepancy between an actual charge pressure, and a target charge pressure, and/or a discrepancy between an actual methane number of the gas and a target methane number of the gas, and/or a discrepancy between an actual ignition timing of the engine and a target ignition timing of the engine, and/or a discrepancy between an actual charge air temperature and a target charge air temperature and/or a discrepancy between an actual ambient air humidity and a target ambient air humidity, and/or an actual engine load are/is preferably taken into account in the calculation of the target or reference gas consumption. Taking one or more of the above operating conditions or ambient conditions into account allows a particularly advantageous conversion of an actual gas consumption acquired under actual operating conditions to a target or reference gas consumption under target or reference operating conditions.

According to one aspect of the invention, the calculation of the target or reference gas consumption is carried out according to the following equations:

$$V_{TARGET} = V_{ACTUAL} * KR1 * KR2 * KR3 * KR4 * KR5 * KR6 * KR7 * KR8$$

$$KR1 = 1 + k1 * (T_{U\text{-}ACTUAL} - T_{U\text{-}TARGET})$$

$$KR2 = 1 - k2 * (p_{U\text{-}ACTUAL} - p_{U\text{-}TARGET})$$

$$KR3 = 1 + k3 * (p_{AG\text{-}ACTUAL} - p_{AG\text{-}TARGET})$$

$$KR4 = 1 + k41 * ML_{ACTUAL}^{-K42} * (p_{LL\text{-}ACTUAL} - p_{LL\text{-}TARGET})$$

$$KR5 = 1 + k5 * (MZ_{ACTUAL} - MZ_{TARGET})$$

$$KR6 = 1 + k61 * (ZZT_{ACTUAL}^2 - ZZP_{TARGET}^2) - K62 * (ZZT_{ACTUAL} - ZZP_{TARGET})$$

$$KR7 = 1 - k7 * (T_{LL\text{-}ACTUAL} - T_{LL\text{-}TARGET})$$

$$KR8 = 1 + k8 * (H_{U\text{-}ACTUAL} - H_{U\text{-}TARGET}),$$

where $V_{TARGET}$ is the target or reference gas consumption of the engine, $V_{ACTUAL}$ is the actual gas consumption of the engine, $T_U$ is the ambient air temperature, $p_U$ is the ambient air pressure, $p_{AG}$ is the exhaust gas backpressure, $p_{LL}$ is the charge pressure, MZ is the methane number of the gas, ZZP is the ignition timing of the engine, $T_{LL}$ is the charge air temperature, $H_U$ is the ambient air humidity, and ML is the engine load, and where k1, k2, k3, k41, k42, k5, k61, k62, k7, k8 are engine-dependent constants. The use of these equations allows a particularly advantageous conversion of the actual gas consumption to the target or reference gas consumption.

Preferred further developments of the invention are indicated in the subclaims and in the following description. Embodiment examples of the invention are described more fully with reference to the drawings without the invention being limited to these embodiment examples.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawings show:

The only FIGURE is a block diagram of a gas-powered engine.

DETAILED DESCRIPTION OF THE PRESENTLY PREFERRED EMBODIMENTS

The invention is directed to a gas-powered engine 10, particularly a gas engine or a dual fuel engine. The gas-powered engine 10 comprises a plurality of cylinders 11 in which gas G is burned as fuel.

Further, for combustion of the gas G in the cylinders 11 of the engine 11, charge air LL is fed to the cylinders 11. Exhaust gas AG is formed during the combustion of the gas G in the cylinders 11 of the engine 10.

An exhaust gas turbocharger 12 cooperates with the engine 10. Exhaust gas AG which forms during the combustion of the gas G in the cylinders 11 of the engine 10 is fed to a turbine 13 of the exhaust gas turbocharger 12. Energy obtained in this way is utilized in a compressor 14 of the exhaust gas turbocharger 12 to compress the charge air LL to be fed to the cylinders 11 of the engine 10.

It is an insight of the invention that the gas consumption of a gas-powered engine 10, namely, of a gas-powered gas engine or a gas-powered dual-fuel engine, is dependent on diverse ambient conditions or operating conditions, namely, on ambient air pressure and/or ambient air temperature and/or ambient air humidity and/or methane number of the gas and/or ignition timing of the engine and/or charge air temperature and/or charge air pressure and/or exhaust gas backpressure.

Accordingly, it is suggested according to one aspect of the invention to convert an actual gas consumption acquired under prevailing actual operating conditions of the engine 10 to a target gas consumption to be anticipated under target operating conditions or reference operating conditions, namely, depending on discrepancies between the actual operating conditions under which the actual gas consumption was acquired and the target operating conditions or reference operating conditions for which the target gas consumption or reference gas consumption is to be calculated. For the sake of simplicity, only the expressions target gas consumption and target operating conditions will be used.

The FIGURE shows a plurality of sensors 15, 16, 17, 18, 19, 20 and 21 by which the actual operating conditions can be acquired by measuring techniques. Accordingly, sensor 15 acquires an actual charge air pressure and sensor 16 acquires an actual charge air temperature. A sensor 17 acquires an actual methane number of the gas G. A sensor 18 acquires an actual exhaust gas backpressure downstream of the turbine 13 of the exhaust gas turbocharger 12. Sensors 19, 20 and 21 acquire an actual ambient air temperature, an actual ambient air pressure and an actual ambient air humidity. The actual operating conditions measured by sensors 15, 16, 17, 18, 19, 20 and 21 can be made available to a control device 22. The engine 10 further provides data about the actual ignition timing to the control device 22.

Based on one or more of the actual operating conditions measured by sensors 15 to 21 and on the relevant target operating conditions, the control device 22 determines a target gas consumption under the target operating conditions from the actual gas consumption that was acquired under the actual operating conditions, namely, depending on discrepancies between the respective actual operating condition and the respective target operating condition.

The calculation of the target gas consumption is preferably carried out using the following equations:

$$V_{TARGET} = V_{ACTUAL} * KR1 * KR2 * KR3 * KR4 * KR5 * KR6 * KR7 * KR8$$

$$KR1 = 1 + k1 * (T_{U\text{-}ACTUAL} - T_{U\text{-}TARGET})$$

$$KR2 = 1 - k2 * (p_{U\text{-}ACTUAL} - p_{U\text{-}TARGET})$$

$$KR3 = 1 + k3 * (p_{AG\text{-}ACTUAL} - p_{AG\text{-}TARGET})$$

$$KR4 = 1 + k41 * ML_{ACTUAL}^{-K42} * (p_{LL\text{-}ACTUAL} - p_{LL\text{-}TARGET})$$

$$KR5 = 1 + k5 * (MZ_{ACTUAL} - MZ_{TARGET})$$

$$KR6 = 1 + k61 * (ZZT_{ACTUAL}^2 - ZZP_{TARGET}^2) - K62 * (ZZT_{ACTUAL} - ZZP_{TARGET})$$

$$KR7 = 1 - k7 * (T_{LL\text{-}ACTUAL} - T_{LL\text{-}TARGET})$$

$$KR8 = 1 + k8 * (H_{U\text{-}ACTUAL} - H_{U\text{-}TARGET}),$$

where $V_{TARGET}$ is the target gas consumption of the engine, $V_{ACTUAL}$ is the actual gas consumption of the engine, $T_{U\text{-}ACTUAL}$ is the ambient air temperature, $T_{U\text{-}TARGET}$ is the target ambient air temperature, $p_{U\text{-}ACTUAL}$ is the actual ambient air pressure, $p_{U\text{-}TARGET}$ is the target ambient air pressure, $p_{AG\text{-}ACTUAL}$ is the actual exhaust gas backpressure, $p_{AG\text{-}TARGET}$ is the target exhaust gas backpressure, $p_{LL\text{-}ACTUAL}$ is the actual charge pressure, $p_{LL\text{-}TARGET}$ is the target charge pressure, $MZ_{ACTUAL}$ is the actual methane number, $MZ_{TARGET}$ is the target methane number, $ZZP_{ACTUAL}$ is the actual ignition timing, $ZZP_{TARGET}$ is the target ignition timing, $T_{LL\text{-}ACTUAL}$ is the actual charge air temperature, $T_{LL\text{-}TARGET}$ is the target charge air temperature, $H_{U\text{-}ACTUAL}$ is the actual ambient air humidity, $H_{U\text{-}TARGET}$ is the target ambient air humidity, and $ML_{ACTUAL}$ is the actual engine load, and where k1, k2, k3, k41, k42, k5, k61, k62, k7, k8 are engine-dependent constants.

The constants k1, k2, k3, k41, k42, k5, k61, k62, k7, k8 depend in particular on the type of lambda control of the gas-powered engine 10.

When a lambda control of the gas-powered engine 10 is carried out via charge air discharge, then: k1=0, k2=0, k3-0, 0<k41<1, 0<k42<1, 0<k5<1, 0<k61<1, 0<k62<1, 0<k7<1, 0<k8<1.

When a lambda control of the gas-powered engine 10 is carried out via wastegate or via a variable turbine geometry, then: 0<k1<1, 0<k2<1, 0<k3<1, 0<k41<1, 0<k42<1, 0<k5<1, 0<k61<1, 0<k62<1, 0<k7<1, 0<k8<1.

One aspect of the invention allows an actual gas consumption determined under actual operating conditions to be converted safely and reliably to a target gas consumption under target operating conditions.

In particular, one aspect of the invention makes it possible to determine a reference gas consumption for an actual gas consumption determined on test blocks, namely, depending on the actual operating conditions prevailing on the test block and the corresponding reference operating conditions. Thus the actual operating conditions prevailing on different test blocks can be compensated, for example, different actual methane numbers and/or different actual ignition timings and/or different ambient air conditions and/or other operating conditions. In this way, the quality of series of test measurements determined on test blocks can be improved.

The actual operating conditions taken into account are preferably operating conditions which are acquired through measuring techniques. In this way, an actual gas consumption can be converted to a target gas consumption or reference gas consumption in a simple and reliable manner.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for determining a gas consumption of a gas-powered engine, comprising:
    operating the gas-powered engine under actual operating conditions;
    acquiring an actual gas consumption of the gas-powered engine under the actual operating conditions;
    calculating a target gas consumption anticipated under target operating conditions depending on the actual gas consumption and discrepancies between the actual operating conditions and the target operating conditions;
    compensating the actual operating conditions based at least in part on the calculation; and
    operating the gas-powered engine under the compensated actual operating conditions,
    wherein the calculation of the target gas consumption is carried out according to the following equations:

$V_{TARGET} = V_{ACTUAL} * KR1 * KR2 * KR3 * KR4 * KR5 * KR6 * KR7 * KR8$ $KR1 = 1 + k1 * (T_{U-ACTUAL} - T_{U-TARGET})$ $KR2 = 1 - k2 * (p_{U-ACTUAL} - p_{U-TARGET})$ $KR3 = 1 + k3 * (p_{AG-ACTUAL} - p_{AG-TARGET})$ $KR4 = 1 + k41 * ML_{ACTUAL}^{-K42} * (p_{LL-ACTUAL} - p_{LL-TARGET})$ $KR5 = 1 + k5 * (MZ_{ACTUAL} - MZ_{TARGET})$ $KR6 = 1 + k61 * (ZZP_{ACTUAL}^2 - ZZP_{TARGET}^2) - K62 * (ZZP_{ACTUAL} - ZZP_{TARGET})$ $KR7 = 1 - k7 * (T_{LL-ACTUAL} - T_{LL-TARGET})$ $KR8 = 1 + k8 * (H_{U-ACTUAL} - H_{U-TARGET})$, wherein:
    $V_{TARGET}$ is one of the target gas consumption of the gas-powered engine and a reference gas consumption of the gas-powered engine,
    $V_{ACTUAL}$ is an actual gas consumption of the gas-powered engine,
    $T_U$ is an ambient air temperature,
    $p_U$ is an ambient air pressure,
    $P_{AG}$ is an exhaust gas backpressure,
    $p_{LL}$ is a charge pressure,
    MZ is a methane number of the gas,
    ZZP is an ignition timing of the gas-powered engine,
    $T_{LL}$ is a charge air temperature,
    $H_U$ is an ambient air humidity,
    ML is an engine load, and
    k1, k2, k3, k41, k42, k5, k61, k62, k7, k8 are engine-dependent constants.

2. The method according to claim 1, wherein the engine-dependent constants k1, k2, k3, k41, k42, k5, k61, k62, k7, k8 are based on a type of lambda control in the gas-powered engine.

3. The method according to claim 2, wherein with a lambda control via charge air discharge, k1, k2, k3 each equal 0, and k41, k42, k5, k61, k62, k7, k8 are each greater than 0 and less than 1.

4. The method according to claim 2, wherein with a lambda control via one of a wastegate and a variable turbine geometry, charge air discharge, k1, k2, k3, k41, k42, k5, k61, k62, k7, k8 are each greater than 0 and less than 1.

5. The method according to claim 1, wherein the gas-powered engine is one of a gas-powered gas engine and a gas-powered dual-fuel engine.

6. A control device of a gas-powered engine, having a processor and memory, the control device configured to:
    operate the gas-powered engine under actual operating conditions;
    acquire an actual gas consumption of the gas-powered engine under the actual operating conditions;
    calculate a target gas consumption anticipated under target operating conditions depending on the actual gas consumption and discrepancies between the actual operating conditions and the target operating conditions;
    compensating the actual operating conditions based at least in part on the calculation; and
    operating the gas-powered engine under the compensated actual operating conditions,
    wherein the calculation of the target gas consumption is carried out according to the following equations:

$V_{TARGET} = V_{ACTUAL} * KR1 * KR2 * KR3 * KR4 * KR5 * KR6 * KR7 * KR8$ $KR1 = 1 + k1 * (T_{U-ACTUAL} - T_{U-TARGET})$ $KR2 = 1 - k2 * (p_{U-ACTUAL} - p_{U-TARGET})$ $KR3 = 1 + k3 * (p_{AG-ACTUAL} - p_{AG-TARGET})$ $KR4 = 1 + k41 * ML_{ACTUAL}^{-K42} * (p_{LL-ACTUAL} - p_{LL-TARGET})$ $KR5 = 1 + k5 * (MZ_{ACTUAL} - MZ_{TARGET})$ $KR6 = 1 + k61 * (ZZP_{ACTUAL}^2 - ZZP_{TARGET}^2) - K62 * (ZZP_{ACTUAL} - ZZP_{TARGET})$ $KR7 = 1 - k7 * (T_{LL-ACTUAL} - T_{LL-TARGET})$ $KR8 = 1 + k8 * (H_{U-ACTUAL} - H_{U-TARGET})$, wherein:
- $V_{TARGET}$ is one of the target gas consumption of the gas-powered engine and a reference gas consumption of the gas-powered engine,
- $V_{ACTUAL}$ is an actual gas consumption of the gas-powered engine,
- $T_U$ is an ambient air temperature,
- $p_U$ is an ambient air pressure,
- $P_{AG}$ is an exhaust gas backpressure,
- $p_{LL}$ is a charge pressure,
- MZ is a methane number of the gas,
- ZZP is an ignition timing of the gas-powered engine,
- $T_{LL}$ is a charge air temperature,
- $H_U$ is an ambient air humidity,
- ML is an engine load, and
- k1, k2, k3, k41, k42, k5, k61, k62, k7, k8 are engine-dependent constants.

7. The method according to claim 6, wherein the engine-dependent constants k1, k2, k3, k41, k42, k5, k61, k62, k7, k8 are based on a type of lambda control in the gas-powered engine.

8. The method according to claim 7, wherein with a lambda control via charge air discharge, k1, k2, k3 each equal 0, and k41, k42, k5, k61, k62, k7, k8 are each greater than 0 and less than 1.

9. The method according to claim 7, wherein with a lambda control via one of a wastegate and a variable turbine geometry, charge air discharge, k1, k2, k3, k41, k42, k5, k61, k62, k7, k8 are each greater than 0 and less than 1.

10. The method according to claim 6, wherein the gas-powered engine is one of a gas-powered gas engine and a gas-powered dual-fuel engine.

* * * * *